US006976262B1

(12) United States Patent
Davis et al.

(10) Patent No.: US 6,976,262 B1
(45) Date of Patent: Dec. 13, 2005

(54) WEB-BASED ENTERPRISE MANAGEMENT WITH MULTIPLE REPOSITORY CAPABILITY

(75) Inventors: James D. Davis, Pepperell, MA (US); Thomas V. Johnson, Burlington, MA (US); Charles C. Ting, Wayland, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,591

(22) Filed: Jun. 14, 1999

Related U.S. Application Data

(60) Provisional application No. 60/139,239, filed on Jun. 14, 1999.

(51) Int. Cl.[7] ................................. G06F 9/46
(52) U.S. Cl. ..................... 719/328; 709/230; 707/3; 707/103 R; 707/104.1
(58) Field of Search ..... 709/200–253; 707/100–104.1, 707/1–10; 719/328

(56) References Cited

U.S. PATENT DOCUMENTS

| | | | |
|---|---|---|---|
| 5,136,716 A | * | 8/1992 | Harvey et al. ............... 709/228 |
| 5,452,433 A | * | 9/1995 | Nihart et al. |
| 6,061,721 A | * | 5/2000 | Ismael et al. ................ 709/223 |

(Continued)

FOREIGN PATENT DOCUMENTS

| | | | | |
|---|---|---|---|---|
| EP | 0613274 A | | 8/1999 | ........... H04L 29/06 |
| WO | WO98/04971 | | 2/1998 | ............. G06F 9/40 |

OTHER PUBLICATIONS

Newkerk et al. "The Common Agent. A Multi-Protocol Management Agent" (http://citeseer.nj.nec.com/5460.html) Digital Equipment Corp.*
Thompson et al., *"Successful Practices in Developing a Complex Information Model,"* Conceptual Modeling—ER '97. 16th Annual International Conference on Conceptual Modeling, Berlin, Germany, 1997 pp. 376-393.
European Search Report in Corresponding EP Application 00304971.5-2211-.

Primary Examiner—Meng-Al T. An
Assistant Examiner—Charles Anya
(74) Attorney, Agent, or Firm—Beyer Weaver & Thomas LLP

(57) ABSTRACT

A transport neutral technique allows an object manager to communicate with a CIM repository using any of a variety of protocols. The object manager software is independent of the transport mechanism used and need not be changed if the transport mechanism changes. A computer system to be managed includes a CIM object manager and any number of provider APIs that provide resource information about the computer system. A CIM repository stores classes and instances used by the object manager. A remote application computer runs a software management application that communicates with the object manager of the computer system using a local client API. A Repository API of the object manager includes an interface definition defining all methods called by the object manager. Also included is a protocol-specific class that implements the interface definition; there is a protocol-specific class for each protocol desired to be supported. Each class implements methods using a specific protocol. A factory class is executed when the object manager invokes a method call passing in a desired protocol parameter. The factory class creates a protocol-specific object of one of the protocol-specific classes depending on the protocol parameter. The object is returned to the object manager which executes one of its protocol-specific methods thus allowing communication to a repository using a protocol independent of the object manager.

10 Claims, 11 Drawing Sheets

U.S. PATENT DOCUMENTS 6,134,581 A * 10/2000 Ismael et al. ............... 709/202
6,317,748 B1 * 11/2001 Menzies et al. ......... 707/103 X
6,360,258 B1    3/2002 LeBlanc
6,708,207 B1 *  3/2004 Sabelhaus et al. .......... 709/223

* cited by examiner

Instances

| | Name | Type | Value |
|---|---|---|---|
| X | CSCreationClassName | STRING | Solaris_ComputerSystem |
| X | CSName | STRING | zoomass |
| X | CreationClassName | STRING | Solaris_OperatingSystem |
| X | Name | STRING | SunOS |
| | OSType | UINT16 | 29 |
| | OtherTypeDescription | STRING | <empty> |
| | Version | STRING | <empty> |
| | LastBootUp Time | Date Time | <empty> |
| | LocalDate Time | Date Time | <empty> |
| | CurrentTimeZone | SINT16 | <empty> |
| | NumberOfLicensedUsers | UINT32 | <empty> |
| | NumberOfUsers | UINT32 | <empty> |
| | NumberOfProcesses | UINT32 | <empty> |
| | MaxNumberOfProcesses | UINT32 | <empty> |
| | TotalSwapSpaceSize | UINT64 | <empty> |
| | TotalVirtualMemorySize | UINT64 | <empty> |
| | FreeVirtualMemory | UINT64 | <empty> |
| | FreePhysicalMemory | UINT64 | <empty> |
| | SizeStoredinPagingFiles | UINT64 | <empty> |

FIG. 3B

Implementation Definition for Interface

Factory

WEB-BASED ENTERPRISE MANAGEMENT WITH MULTIPLE REPOSITORY CAPABILITY

This application claims priority of U.S. provisional patent application No. 60/139,239, filed on Jun. 14, 1999, entitled "Web-based Enterprise Management," which is hereby incorporated by reference.

This application is related to U.S. patent application Ser. No. 09/333,878 filed on the same date herewith, entitled "Web-Based Enterprise Management with TRANSPORT NEUTRAL CLIENT INTERFACE," which is hereby incorporated by reference.

FIELD OF THE INVENTION

The present invention relates generally to managing the resources of a computer system. More specifically, the present invention relates to a technique for communicating database operations from a Common Information Model (CIM) object manager to multiple remote CIM repositories.

BACKGROUND OF THE INVENTION

Recently, computers and their associated peripheral equipment (a computer system) have become increasing more complex. As such, it has become progressively more and more complicated for a user or system administrator to manage the resources of such a computer system. With a variety of peripheral devices and software applications available for use, and their ever-changing nature, the job of a system administrator has become more difficult. Computer system resources such as attached devices, network connections, software applications, etc., must all be managed to ensure an efficiently working system for the user. Within a large corporation having large numbers of such computer systems spread around the world, the task of managing the resources of each computer system can be daunting.

Recently, the industry has responded to such a need by introducing Web-Based Enterprises Management (WBEM) which is both an initiative and a technology. As an initiative, WBEM includes a standard for managing systems, networks, users, and applications by using Internet technology. As a technology, WBEM provides a way for management applications to share management data independently of vendor, protocol, operating system, or management standard. By developing management applications according to WBEM principles, vendors can develop products that work together easily at a lower cost of development.

One known standard for implementation of WBEM is the Common Information Model (CIM). CIM is an approach to managing systems and networks. CIM provides a common conceptual framework to classify and define the parts of a network environment and depict how they integrate. The model captures notions that are applicable to all areas of management, independent of technology implementation.

WBEM software includes tools and technology that software developers can use to create CIM-compliant software applications that manage the environment of a computer system. Developers can also use this software to write "providers," programs that supply data and events for managed objects that are specific to their domain.

There can be drawbacks, however, associated with various implementations of WBEM software. For example, it may be necessary for the object manager of a computer system to be able to access different types of databases, whether local or remote. Not all implementations, however, are well-suited for this type of access.

FIG. 1 illustrates a prior art computer system 10 that has resources to be managed. Resources include disk usage, CPU utilization, running applications, etc. Not shown for simplicity are hardware components of the computer system or other software applications. A CIM object manager 20 is responsible for handling all communication between management applications, a CIM repository 26 and managed objects. In this example, CIM repository 26 is a local drive that communicates via a local connection 28 to object manager 20. A provider application programming interface (API) 22 provides an interface to any needed system information 24 to be provided to object manager 20. Object manager 20 may also access CIM repository 26 over local connection 28 to quickly retrieve data objects that have been previously stored. In this fashion, object manager 20 is well-suited for gathering resource information regarding computer system 10.

In order to efficiently manage the resources of computer system 10, a software developer 30 writes management application software 32 for managing the resources of the computer system. When in operation, the results of management application 32 may be used by a system administrator 40 to manage the computer system. Client application 32 communicates via a Client API 34 to retrieve resource information from computer system 10. Client API 34 uses any suitable local or remote network connection 36 to access object manager 20.

Prior art implementations of this sort use a single protocol for communication from object manager 20 to CIM repository 26 over local connection 28. Such an implementation is inflexible in that the object manager commands to repository 26 are dependent upon a single protocol. In other words, the commands are not independent of the protocol; should the protocol be modified or if another protocol be used or desired, it will be necessary to rewrite portions of object manager 20 which would be undesirable.

In addition, having an object manager that is depended upon a particular protocol presents difficulties when repository 26 is remote from object manager 20. In this scenario, it may be desirable to communicate over a network connection using any of a variety of protocols instead of always being required to use a local protocol. In prior art computer system 10 portions of object manager 20 would have to be rewritten for each and every different protocol that is desired to be used.

Therefore, a technique is desired that would permit an object manager to communicate both locally and remotely with any number of repositories using any of a variety of protocols. It is desired to implement this technique with the least impact upon developers of object manager software.

SUMMARY OF THE INVENTION

To achieve the foregoing, and in accordance with the purpose of the present invention, a technique is disclosed that allows an object manager to communicate with any number of repositories using any of a variety of local or remote protocols. Advantageously, the object manager becomes independent of protocol used and need not be changed if the protocol changes.

In one embodiment, a method is used for communication between a Common Information Model (CIM) object manager and a CIM repository. The method involves first creating a connection between the object manager the CIM repository. Next, a protocol indicator is passed from the object manager to a repository API. The protocol indicator identifies a protocol by which the object manager desires to communicate with the CIM repository. A protocol-specific object is created having methods implemented using the protocol. Finally, the protocol-specific object is returned to the object manager, thus the object manager may communicate with the CIM repository using the protocol desired.

In another embodiment, a computer system interacts with a CIM repository on a separate computer. The computer system includes an object manager that has program code for interacting with the CIM repository and a protocol indicator. Also included is a repository application programming interface (repository API) that has a factory class arranged to receive the protocol indicator from the object manager and produce a protocol-specific object. Also within the repository API is a first class having methods defined thereon implemented in a first protocol and a second class having methods defined thereon implemented in a second protocol. Thus, the protocol-specific object may be returned to the object manager for use in communicating with the CIM repository using a desired protocol.

BRIEF DESCRIPTION OF THE DRAWINGS

The invention, together with further advantages thereof, may best be understood by reference to the following description taken in conjunction with the accompanying drawings in which:

FIGS. 3A and 3B illustrate an example graphical user interface for the CIM workshop of FIG. 2.

DETAILED DESCRIPTION OF THE INVENTION

Figure 1:
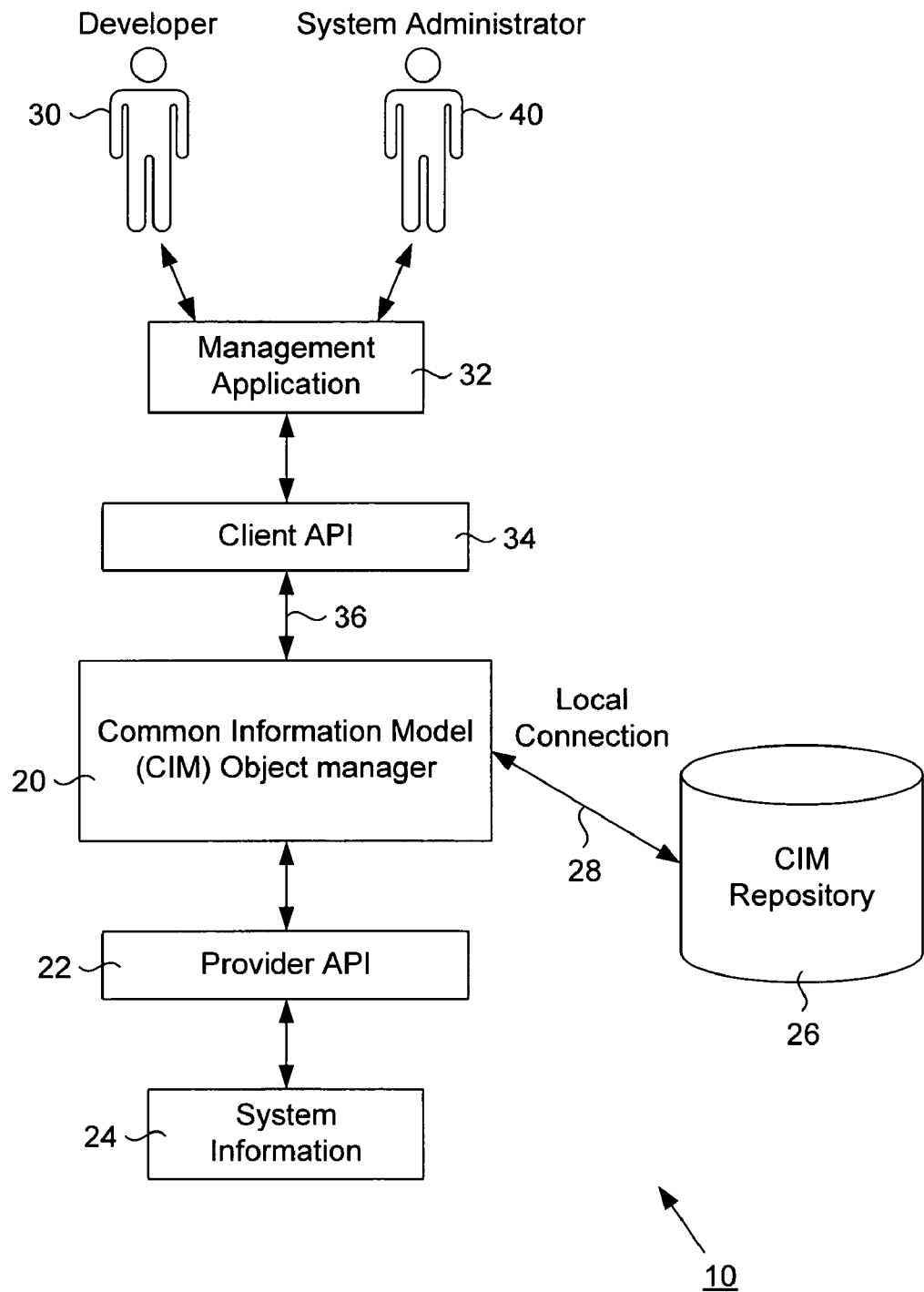
FIG. 1 illustrates a prior art computer system that has managed resources.
Figure 2A:
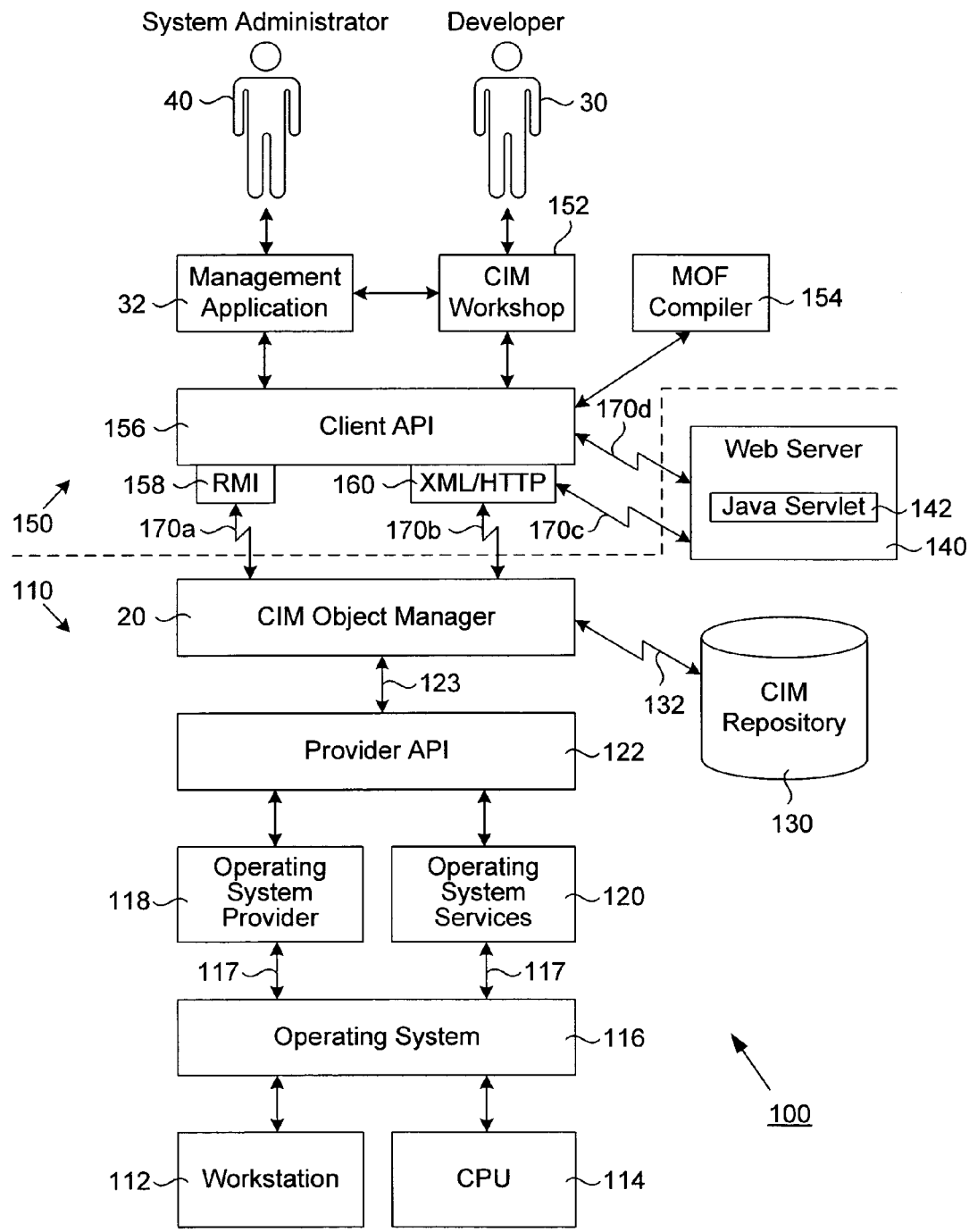
FIGS. 2A and 2B illustrate a Web-Based Enterprise Management (WBEM) architecture suitable for implementing an embodiment of the invention.
Figure 2B:
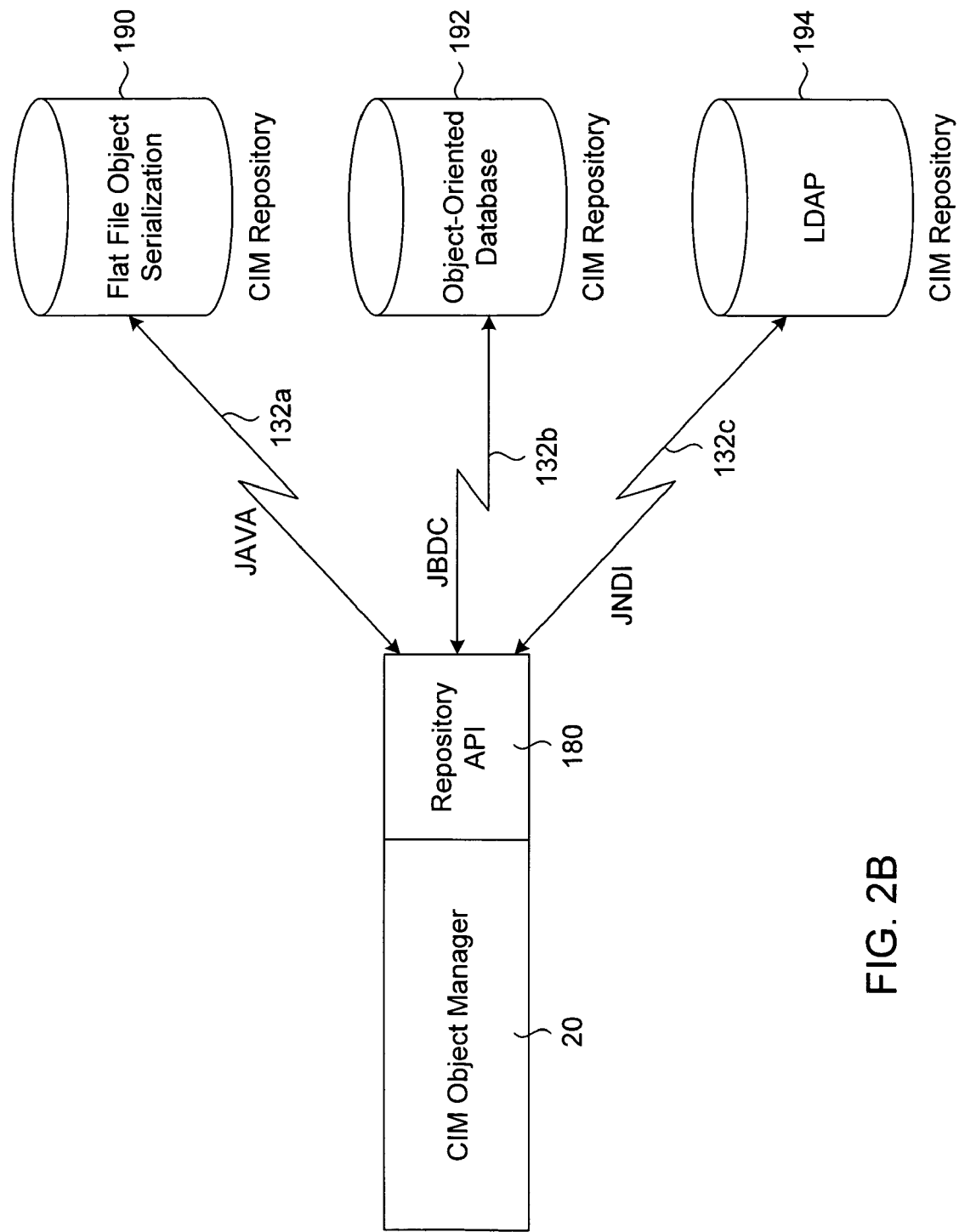

FIGS. 2A and 2B illustrate a Web-Based Enterprise Management (WBEM) architecture suitable for implementing an embodiment of the invention. Architecture 100 includes computer system 110 having resources to be managed, and application computer 150 where management applications are developed and run. Computer system 110 may be any suitable computer having resources needing to be managed such as CPU load, disk space, installed applications, etc. The hardware layer includes workstation 112 and CPU 114. Workstation 112 may be any suitable computer workstation such as the SPARC workstation from Sun Microsystems, Inc. CPU 114 may be any suitable processor such as an Intel processor. The software layer of computer system 110 includes operating system 116 (other software applications not shown for simplicity) which may be any suitable operating system such as the Solaris operating system from Sun Microsystems, Inc.

The object provider layer of computer system 110 includes operating system provider 118, operating system services 120 and provider application programming interface (API) 122. The provider layer communicates with operating system 116 via interface 117, for example, by using a JAVA Native Interface (JNI). Object providers act as intermediaries between CIM object manager 20 and one or more managed devices. When object manager 20 receives a request from a management application 32 for data that is not available in CIM repository 130 it forwards the request to a provider. Object providers are installed on the same machine as object manager 20. Object manager 20 then uses provider API 122 to communicate with locally installed providers. Providers are classes that perform various functions in response to a request from object manager 20. For example, providers map information from a managed device to a CIM JAVA class and map information from a CIM JAVA class to a managed device format.

Provider API 122 is an API used by various provider programs to communicate information about managed objects to object manager 20. Operating system provider 118 is a collection of JAVA classes or native methods that represent the operating environment of computer system 110. Operating system services 120 also provide logging information from operating system 116 to object manager 20.

A variety of other providers may also be present. For example, an SNMP provider includes JAVA classes that map CIM data to SNMP data. Also, a CPU-specific provider may be used to transport resource information directly between CPU 114 and provider API 122, thus bypassing operating system 116.

Providers may be categorized into three types according to the requests they service. An instance type supplies dynamic instances of a given class and supports the retrieval, enumeration, modification and deletion operations. A property type supplies dynamic property values, for example, disk space. A method type supplies methods of one or more classes. A single provider can support both methods and instances. Most providers are "pull" providers which mean they maintain their own data, generating it dynamical if necessary. Pull providers have minimal interaction with object manager 20 and CIM repository 130. The data managed by a pull provider typically changes frequently, requiring the provider to either generate the data dynamically or retrieve it from a local cache whenever an application issues a request. A single provider can act simultaneously as a class instance and method provider by proper registration and implementation of all relevant methods.

The management layer of computer system 110 includes CIM object manager 20, CIM repository 130 and web server software 140. Object manager 20 may be any suitable WBEM compliant manager. Object manager 20 manages CIM objects that are represented internally as JAVA classes. Client computers running management applications (such as application computer 150) connect to object manager 20 for resource information about computer system 110. When a WBEM client connects to object manager 20 it receives a reference to that object manager. The client can then perform WBEM operations using this reference.

When management application 32 uses client API 156 to request or update information about a managed object, object manager 20 contacts either the appropriate provider for that object or a suitable persistent storage mechanism such as repository 130. In one embodiment, classes that are handled by a provider have a "provider" qualifier that identifies the provider to contact for the class. When object manager 20 receives a request for a class that has a "provider" qualifier, it routes the request to the specified provider. If no provider is specified it routes the request to repository 130 using JAVA Naming and Directory Interface (JNDI) 132.

Object manager 20 also performs various start-up functions: starting and registering the RMI server; registering the XML server; setting up a connection to repository 130; and waiting for incoming requests. Object manager 20 also performs other normal operations: performing security checks such as authentication and authorization; performing syntactical and semantic checking of CIM data operations; routing requests to providers or persistent storage; and delivering data from providers or from persistent storage to client management applications.

CIM repository 130 is a central storage area for CIM class and instance definitions that communicates with object manager 20 via connection 132. Connection 132 may be any suitable local connection within computer system 110, or may be a remote connection. Connection 132 may use any suitable protocol. Further details on communication with repository 130 are provided in FIG. 2B and in FIGS. 4–8.

Web server software 140 may be any suitable WBEM XML-compliant web server such as the Sun Web Server available from Sun Microsystems, Inc. JAVA servlet 142 converts XML data to the client API format. For example, if management application 132 contains XML data, client API client 156 encodes the data as XML messages and transports the encoded messages to web server 140 that is running JAVA servlet 142. Web server 140 listens for XML messages on a standard port and passes control to servlet 142 when detected. Servlet 142 then decodes the XML messages it receives. Servlet 142 then converts the XML data to the client API format and transmits the information back to client API 156 in RMI format. Alternatively, should object manager 20 support the HTTP format, client API 156 may communicate directly to object manager 20 without the need for web server 140.

The application layer of WBEM architecture 100 includes management application 32, CIM workshop 152, MOF compiler 154 and client application programming interface (API) 156. In this embodiment of the invention, these elements of the application layer are shown running on application computer 150 (other hardware and software not shown for simplicity). Alternatively, application computer 150 and computer system 110 may be the same computer or the elements of the application layer may reside on a variety of computers and not exclusively on application computer 150.

A software developer 30 uses any suitable software tool to develop a management application 32 for processing and displaying data from managed objects of computer system 110. Management application 32 uses client API 156 to request information about managed objects from object manager 20. In this fashion, analysis of the resources of computer system 110 can be presented to a system administrator 40 for proper action.

Client API 156 and provider APIs represent and manipulate CIM objects. These APIs represent CIM objects as JAVA classes. An object is a computer representation or model of a managed resource of computer system 110 such as a printer, disk drive or CPU. A developer uses the CIM specification to describe managed objects and to retrieve information about managed objects in computer system 110.

One advantage of modeling managed resources using CIM is that those objects can be shared across any system that is CIM compliant.

Management application 32 may be any of a wide variety of software applications written to analyze and manage the resources of computer system 110. By way of example, management application 32 manages system aspects such as disk information (space available, partitions, etc.), CPU load, event processing, date, time, time zone, memory available, ports, etc.

Application 32 may also manage specific devices of the computer system such as disks, tape drives, modems, other I/O devices, NICs, and network aspects of the system such as TCP/IP, Netbeui, Novell, etc. Further, management application 32 manages the software applications running on computer system 110 by determining what is currently running on the system, what is currently installed, the state of installation, which applications can be terminated, performing application metering, managing application life cycle, process management, user management, etc.

In one embodiment of the invention, developer 30 uses a CIM workshop 152 written in JAVA for viewing, changing, adding and deleting CIM classes and instances. CIM workshop 152 provides a graphical user interface for the developer. For example, developer 30 may view and select namespaces, may add namespaces, add properties, qualifiers and methods to new classes, view and create instances, and view and modify instance values. Developer 30 may also use CIM workshop 152 to browse a class inheritance tree and change the root of an object tree for a namespace.

MOF compiler 154 pares files created in the Managed Object Format (MOF), converts files to JAVA class and stores the extracted classes and instances in repository 130. The MOF language is a syntax for defining CIM classes and instances and is described in the CIM specification. Although classes and instances can also be added through client API 156 using JAVA, MOF compiler 154 eliminates the need to write such code. Compiler 154 provides developers and administrators with a simple and fast technique for modifying repository 130.

In one embodiment, client API 156 is a public API that JAVA applications use to request operations from object manager 20. Client API 156 is used by management application 32 to transfer data to and from object manager 20. Client API 156 includes a variety of classes, instances and methods useful for communicating with object manager 20 using any suitable transport mechanism.

Preferably, Client API 156 is an application programming interface used by management application 32 to communicate with object manager 20 using Remote Method Invocation (RMI) protocol 158 or XML over an HTTP protocol 160 according to the techniques described in U.S. patent application Ser. No. 09/333,878 referenced above. Other suitable protocols may also be used such as COM from Microsoft Corporation. Client API 156 may communicate directly with object manager 20 using RMI or may communicate using the XML/HTTP protocol using web server 140. Alternatively, client API 156 can communicate using the XML/HTTP protocol 160 directly should object manager 20 support the HTTP format.

Connections 170a–170d are any suitable local or network connection between computer system 110 and application computer 150. By way of example, these connections occur over an internet, an intranet, an extranet, within a workgroup, or other.

FIG. 2B illustrates further detail in which CIM object manager 20 communicates with any of a variety of remote CIM repositories using a repository API 180. In this embodiment, each of repositories 190, 192 and 194 are located remotely from object manager 20 and computer system 110. In this example each repository is located on a different computer although it is conceivable that all may be located on a single computer, or that a repository is local to computer system 110.

Repository 190 is a database implemented using a flat file technique or object serialization in JAVA; it communicates with Repository API 180 over a network connection 132a that uses simple JAVA code protocol. Repository 192 is an object-oriented database and may be implemented using tools such as those available from Sybase, Oracle, or Informix. Repository 812 communicates with Repository API 180 over a network connection 132b using a JAVA Database Connectivity (JDBC) protocol. Repository 194 is a Lightweight Directory Access Protocol (LDAP) type of database that communicates over network connection 132c using a JAVA Naming Directory Interface (JNDI) protocol.

Repository API 180 is used by object manager 20 to store data to, or retrieve data from, the repositories. Repository API 180 includes a variety of classes, instances and methods useful for communicating with the repositories using any suitable protocol. Preferably, Repository API 180 communicates with the repositories using a JAVA language protocol, a JDBC protocol, a JNDI protocol, an LDAP protocol, an ODBC protocol, or other protocols suitable for use with a database. Implementation of such communication between object manager 20 and the repositories according to an embodiment of the invention is further described in FIGS. 4–8.

Figure 3A:
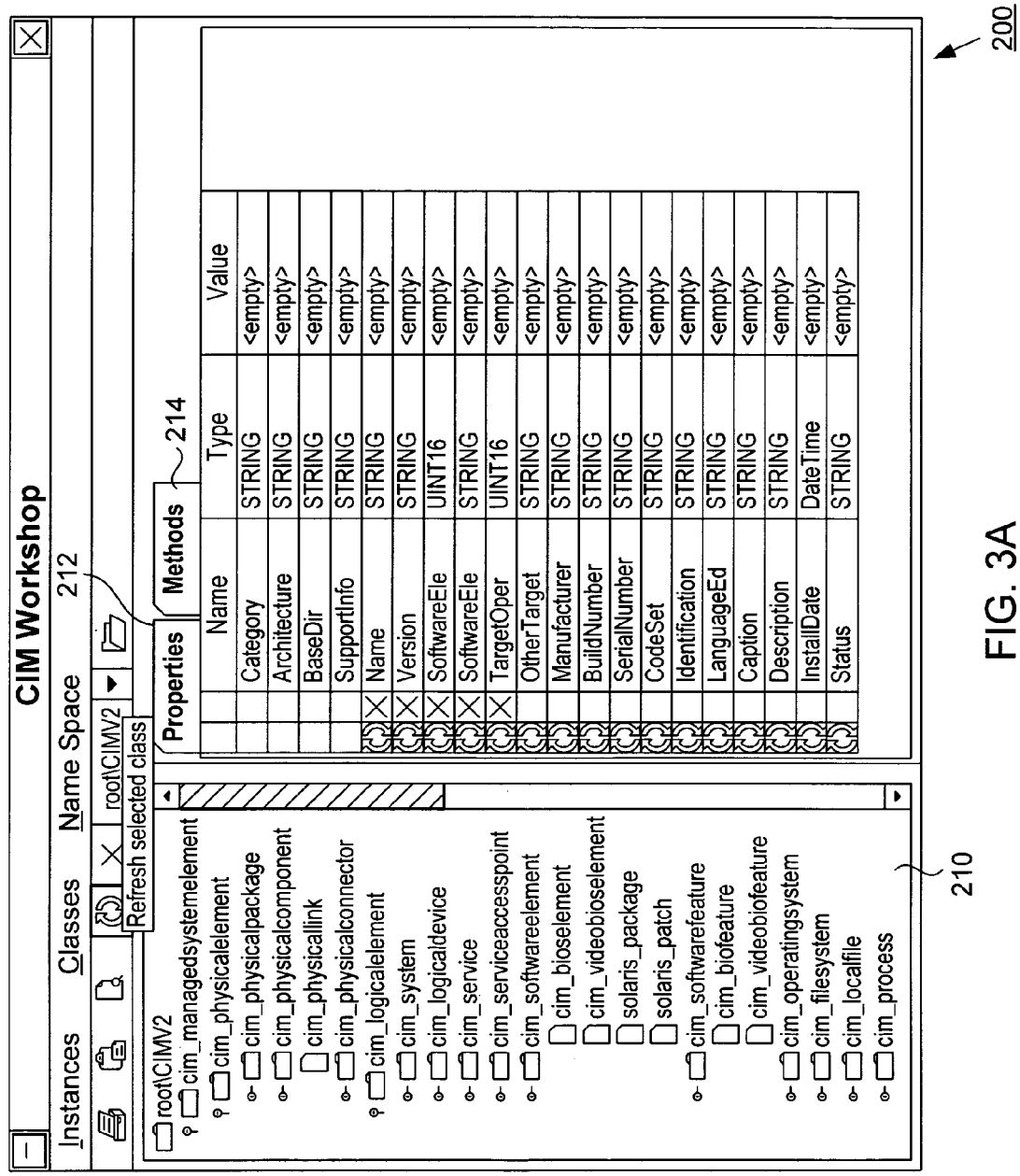

FIGS. 3A and 3B illustrate an example graphical user interface for CIM workshop 152. Preferably, a login to the workshop prompts for a host name, namespace, user name and password. By default, workshop 152 connects to the object manager on the local host in the default namespace. FIG. 3A illustrates CIM classes that represent objects in the selected namespace on the selected host. Listed in panel 210 are the objects of the selected namespace. On the right-hand panel are shown the properties 212 for the selected object (in this case the object "Solaris Package") and methods 214 (not shown). FIG. 3B shows all instances of a selected object. Instances are shown in the left-hand panel, and in this example instance 252 is shown. The right-hand panel shows all properties 254 associated with the selected instance and its associated methods 256 (not shown).

Figure 4:
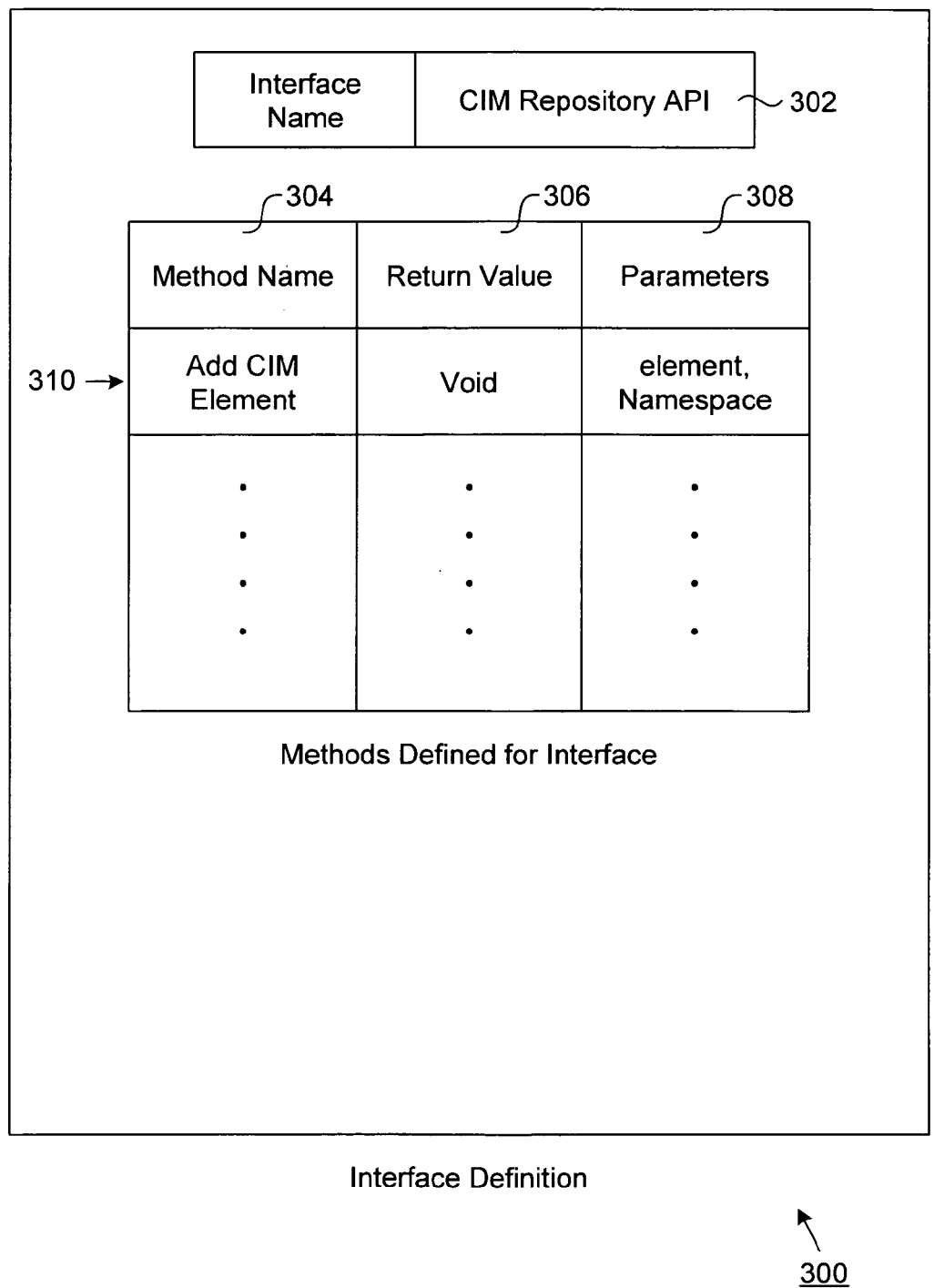
FIG. 4 illustrates an interface definition useful for implementing an embodiment of the invention.

FIG. 4 illustrates an interface definition 300 of Repository API 180 useful for implementing an embodiment of the invention. Interface 300 lists various methods that may be called by object manager 20 in the course of database operations with repositories 190–194. Advantageously, this interface may be implemented using a variety of classes having protocol-specific methods thus allowing a transport neutral object manager to be written. Interface 300 includes an interface name 302 which in this example is "CIM Repository API." Included are a variety of methods defined for the interface. Each method has a method name 304, a return value 306 and parameters 308. By way of example, shown is one method "Add CIM Element" 310 having a return value of "void" and accepting parameters "element" and "namespace." A large number of other methods may be defined for interface 300.

By way of example, these methods include the following. The Create Namespace method creates a CIM namespace, a directory containing classes and instances. (When a management application connects to object manager 20 it specifies a namespace. All subsequent operations occur within that namespace on the object manager host.) The method Delete Class deletes the specified class. The method Delete Instance deletes the specified instance. The method Delete Qualifier deletes the specified qualifier. The method Enumerate Classes retrieves the specified classes from a repository. The method Enumerate Namespace gets a list of namespaces. The method Enumerate Instances gets of list of instances for the specified class. The method Enumerate Qualifier Types get a list of qualifier types for the specified class. The method Get Class gets the CIM class for the specified CIM object path. The Get Instance method gets the CIM instance for the specified CIM object path.

The method Get Qualifier Type gets the qualifier type for the specified CIM object path. The method Set Instance invokes a repository to add or update the specified CIM instance to the specified namespace. Other methods may also be included within interface 300 such as Add Aliased Class Name, Add Aliased Instance Name, Get Aliased Class Name, Get Aliased Instance Name, etc.

Once interface 300 has been defined it is possible to then code protocol-specific methods to implement each of the methods defined in interface 300. In this fashion, any number of protocol-specific classes are provided each having an implementation for a specific protocol such as JDBC or LDAP. Though the use of these protocol-specific classes, object manager 20 is able to communicate with any CIM repository using any suitable protocol in a transparent fashion.

Figure 5:
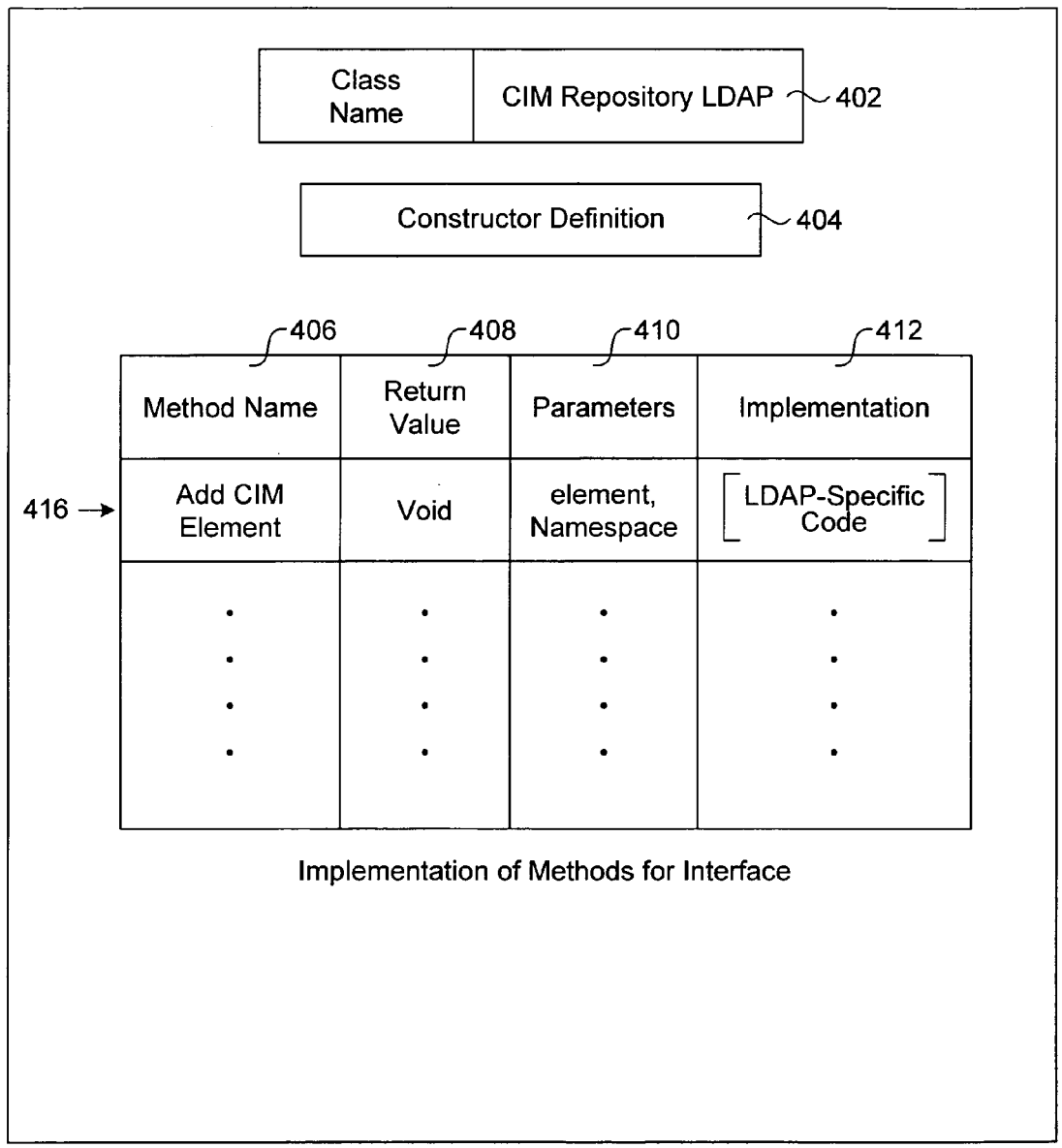
FIG. 5 illustrates an implementation definition for the interface of FIG. 4.

FIG. 5 illustrates an implementation definition 400 for the interface of FIG. 4. Specifically, implementation 400 implements class "CIM Repository API" using methods specific to the LDAP protocol. Such protocol-specific methods allow object manager 20 to communicate via Repository API 180 to repository 194 using the LDAP protocol. Implementation 400 includes a class name 402 "CIM Repository LDAP." Also included is constructor definition code 404 that constructs an instance of class 402 that is specific to the LDAP protocol. Use of a constructor definition to create an instance is well known to those of skill in the art.

Also included in implementation 400 are the specific implementations of the methods defined upon interface 300. For each method implemented there is a method name 406, a return value 408, parameters 410 and implementation code 412. Implementation code 412 is preferably JAVA code that implements the particular method using any constructs necessary that are specific to the RMI protocol. Those of skill in the art will appreciate how to implement JAVA code for a particular purpose that must adhere to a specific protocol.

Preferable, all of the methods defined upon interface 300 are implemented in implementation 400. Shown by way of example is the method Add CIM Element 416 which has a return value of "void" and accepts the parameters element and namespace. Not shown for simplicity is the actual LDAP-specific JAVA code that implements the method Add CIM Element. The other methods defined in interface 300 are also listed in implementation 400 along with their LDAP-specific code.

Figure 6:
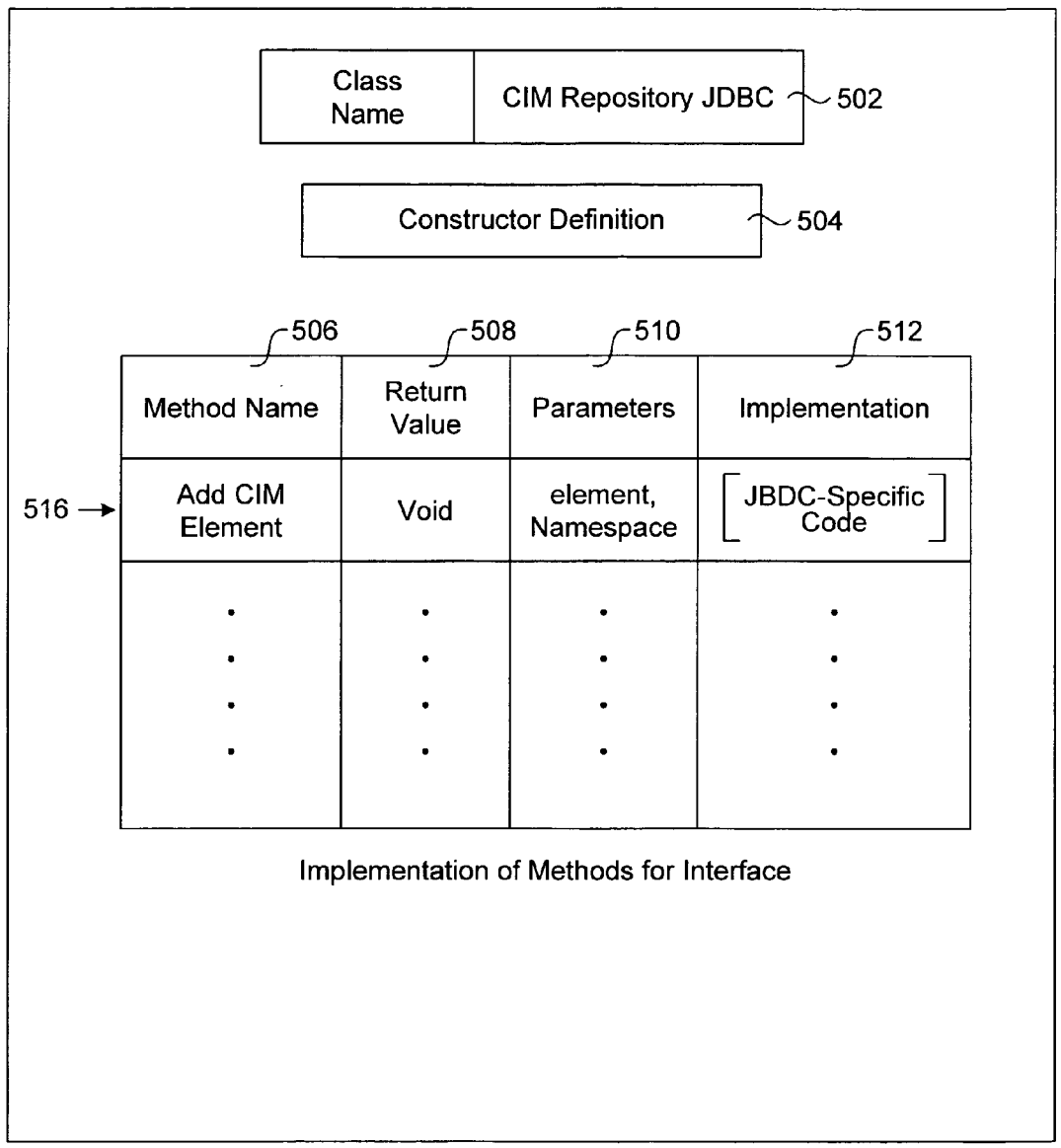
FIG. 6 illustrates another implementation definition for the interface of FIG. 4.

FIG. 6 illustrates an implementation definition 500 for the interface of FIG. 4. Specifically, implementation 500 implements class "CIM Repository API" using methods specific to the JDBC protocol. Such protocol-specific methods allow object manager 20 to communicate via Repository API 180 to repository 192 using the JDBC protocol. Implementation 500 includes a class name 502 "CIM Repository JDBC." Also included is constructor definition code 504 that constructs an instance of class 502 that is specific to the JDBC protocol. Use of a constructor definition to create an instance is well known to those of skill in the art.

Also included in implementation 500 are the specific implementations of the methods defined upon interface 300. For each method implemented there is a method name 506, a return value 508, parameters 510 and implementation code 512. Implementation code 512 is preferably JAVA code that implements the particular method using any constructs necessary that are specific to the JDBC protocol. Those of skill in the art will appreciate how to implement JAVA code for a particular purpose that must adhere to a specific protocol.

Preferable, all of the methods defined upon interface 300 are implemented in implementation 500. Shown by way of example is the method Add CIM Element 516 which has a return value of "void" and accepts the parameters element and namespace. Not shown for simplicity is the actual JDBC-specific JAVA code that implements the method Add CIM Element. The other methods defined in interface 300 are also listed in implementation 500 along with their JDBC-specific code.

Figure 7:
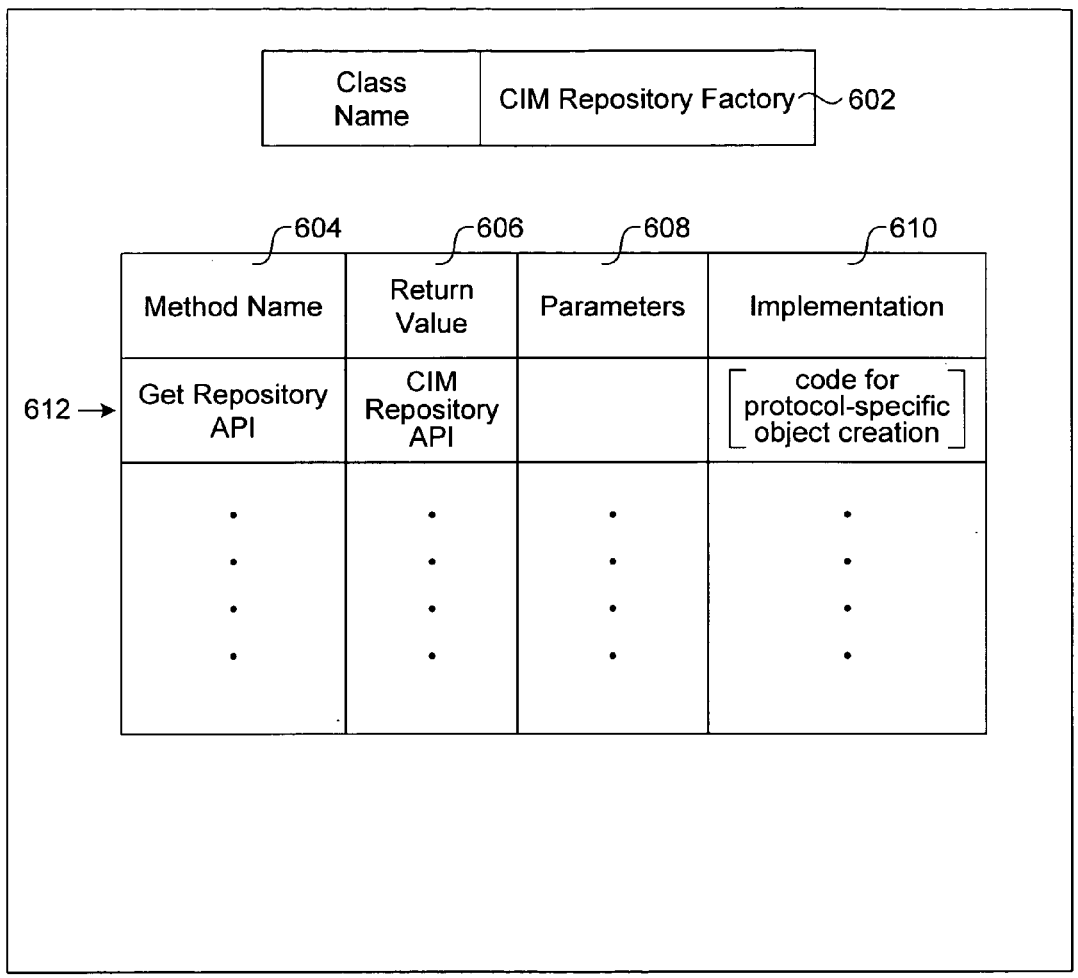
FIG. 7 is a JAVA factory class definition.

FIG. 7 is a JAVA factory class 600. Factory 600 is used for determining which protocol is desired by object manager 20 and directing the creation of a protocol-specific object to be returned to the object manager.

Factory 600 includes a class name 602 "CIM Repository Factory" and any number of defined methods. For each method there is a method name 604, a return value 606, parameters 608 and an implementation 610. In particular, the method Get Repository API accepts the parameters protocol, namespace and version, and returns an instance of interface 300 which is a protocol-specific instance of either implementation 400 or implementation 500. Of course, other protocol-specific objects may be returned if other implementations are defined. The implementation code 610 for method 612 may be any suitable JAVA code that checks the protocol parameter to see which protocol is desired and then directs either implementation 400 or 500 to construct a new instance of itself. By way of example, a series of case statements may be used. Other methods may also be defined and implemented within factory 600.

Object Manager Execution

Figure 8:
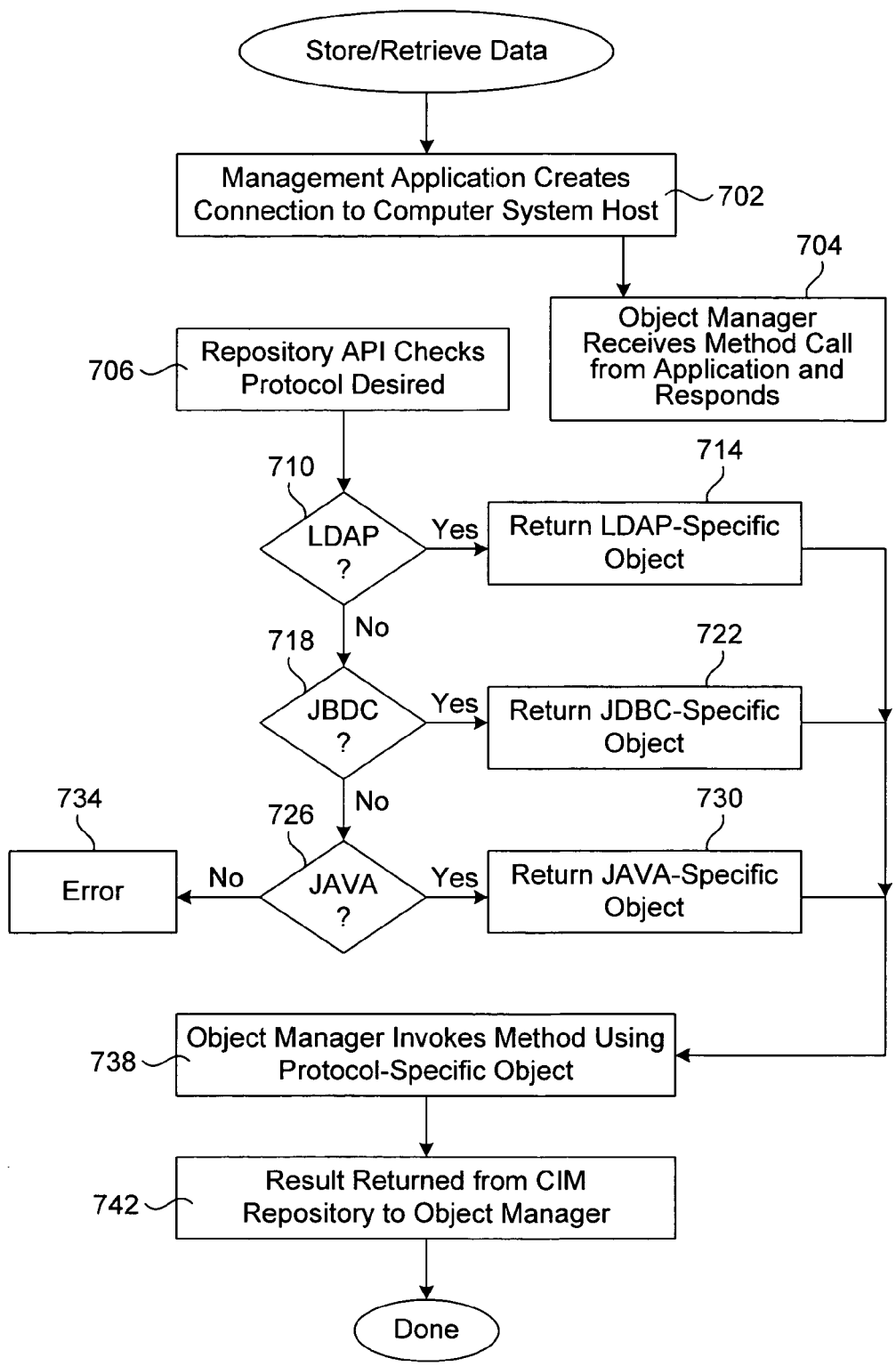
FIG. 8 is a flowchart illustrating a store or retrieve repository method issued by an object manager to a CIM repository.

FIG. 8 is a flowchart illustrating invocation of a method by the object manager to perform a database operation such as storing or retrieving an object. Once management application 32 has been created by developer 30 and the classes and methods of FIGS. 4–7 have been defined, the object manager may perform operations on one of the repositories using any desired protocol. FIG. 8 illustrates a single method call according to one embodiment of the invention.

In step 702 management application 32 creates a connection from application computer 150 to computer system 110. Preferably, application 32 invokes a method within Client API 156 which creates an instance of application 32 within object manager 20. Application 32 passes to the method a host name, a namespace, a user name, a password, and the protocol by which it is desired to communicate with host computer system 110. Any suitable network protocol may be identified such as RMI, XML/HTTP or DCOM.

In step 704 object manager 20 receives a method call from application 32 that requires a database operation. The method call is preferably performed using the technique described in U.S. patent application Ser. No. 09/333,878. In response to this method call, object manager 20 identifies a repository and protocol and makes a call to Repository API 180.

In step 706 factory 600 of Repository API 180 checks the protocol desired by object manager 20 using its method Get Repository API. This method returns a protocol-specific object which is an instance of either the class defined in implementation 400 or the class defined in implementation 500. For example, in step 710 if the protocol parameter is LDAP, then in step 714 the constructor definition 404 of implementation 400 executes and results in an LDAP-specific object having LDAP-specific methods being returned to the object manager. On the other hand, if the protocol parameter is JDBC, then in step 722 the constructor definition 504 of implementation 500 executes and produces a JDBC-specific object which is returned to the object manager. As shown in steps 726 and 730, a desire for use of simple JAVA protocol results in a JAVA-specific object being returned. Other protocols are also supported. In step 738 object manager 20 invokes a desired database method upon the protocol-specific object recently returned. Because the methods of this object are specific to the protocol desired by object manager 20, communication between Repository API 180 and the target repository occurs using the desired protocol in a fashion transparent to application 32 and to object manager 20.

Once the target CIM repository has processed the method (which may be a request for an object, a request to add an object, etc.), then in step 742 the result is returned from the repository to object manager 20 via Repository API 180 using the desired protocol. In this fashion, a technique has been described that allows an object manager to be written independent of the protocol by which it is desired to communicate with a target CIM repository.

Computer System Embodiment

Figure 9:
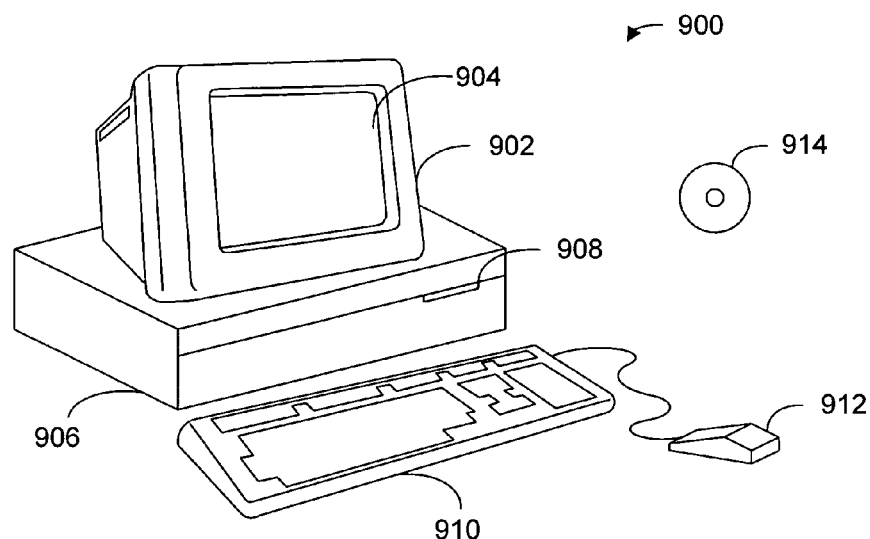
FIGS. 9 and 10 illustrate a computer system suitable for implementing embodiments of the present invention.
Figure 10:
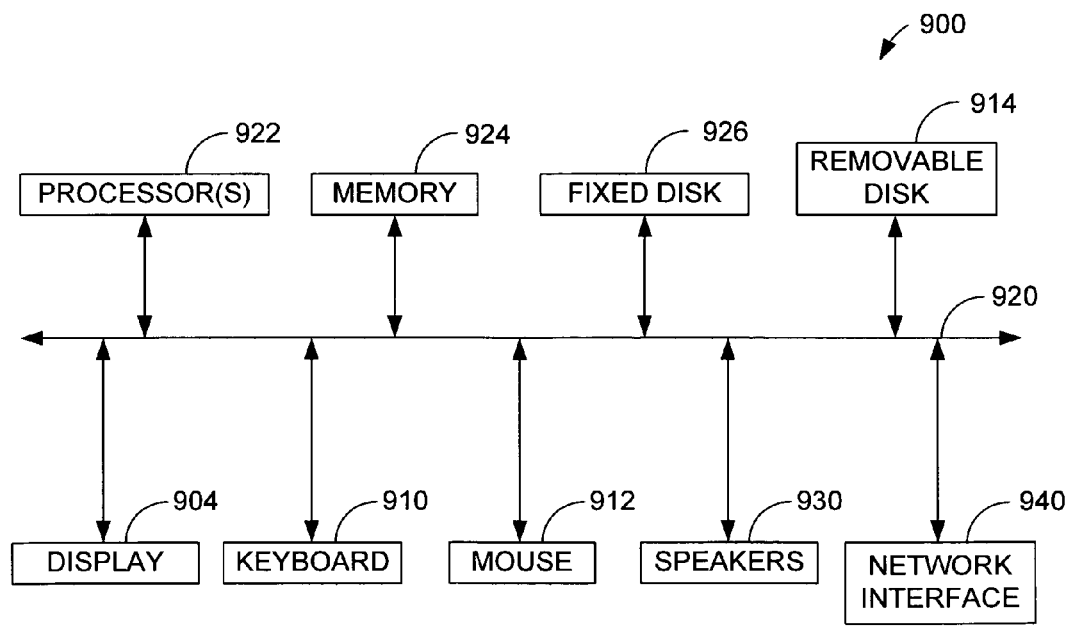

FIGS. 9 and 10 illustrate a computer system 900 suitable for implementing embodiments of the present invention. FIG. 9 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the application computer and the computer system to be managed may be the same computer, or may be separated by a great distance. Also, the various CIM repositories may be located along with the computer system, may each be remotely located on a separate computer, or may be remotely located on a single computer. The use of a web server may not be required should the CIM object manager support the HTTP format. Other types of classes and methods may be used while not departing from the spirit of the invention. Therefore, the described embodiments should be taken as illustrative and not restrictive, and the invention should not be limited to the details given herein but should be defined by the following claims and their full scope of equivalents.

What is claimed is:

1. A method for communication between a Common Information Model (CIM) object manager of a host computer in coordination with a repository application programming interface (API) and at a plurality of CIM repositories, said method comprising:
   creating a connection between said CIM object manager and each one of said plurality of CIM repositories, wherein each one of said CIM repositories has a different associated communication protocol;
   identifying a selected one of said CIM repositories and the communication protocol associated with that selected one of the plurality of CIM repositories;
   passing a communication protocol indicator from said CIM object manager to a repository API associated with said CIM object manager, said protocol indicator identifying the communication protocol associated with that selected one of the plurality of CIM repositories;
   creating, by the repository API, a protocol-specific object having methods implemented using said communication protocol associated with that selected one of the plurality of CIM repositories; and
   returning said protocol-specific object to said CIM object manager, whereby said CIM object manager communicates with said CIM repository using said associated communication protocol.

2. The method of claim 1 further comprising:
   invoking a method defined upon said protocol-specific object;
   transmitting said method using said communication protocol associated with that selected one of the plurality of CIM repositories, over said connection to said selected one of the plurality of CIM repositories; and
   returning a result to said CIM object manager over said connection using said communication protocol associated with that selected one of the plurality of CIM repositories.

3. The method of claim 1 wherein said communication protocol associated with that selected one of the plurality of CIM repositories is LDAP, JDBC, or JAVA.

4. The method of claim 1 wherein said selected one of the plurality of CIM repositories is resident on said host computer.

5. The method of claim 1 wherein said selected one of the plurality of CIM repositories is resident on a separate computer.

6. The method of claim 1 wherein said creating a protocol-specific object includes
   calling a JAVA factory class.

7. A computer-readable medium comprising computer code for communication between a Common Information Model (CIM) object manager of a host computer in coordination with a repository application programming interface (API) and a plurality of CIM repositories, said computer code of said computer-readable medium effecting the following:
   creating a connection between said CIM object manager and each one of said plurality of CIM repositories wherein each one of said CIM repositories has a different associated communication protocol;
   identifying a selected one of said CIM repositories and the communication protocol associated with that selected one of the plurality of CIM repositories;
   passing a communication protocol indicator from said CIM object manager to the repository API associated with said CIM object manager, said protocol indicator identifying the communication protocol associated with that selected one of the plurality of CIM repositories;
   creating, by the repository API, a protocol-specific object having methods implemented using said communication protocol associated that selected one of the plurality of CIM repositories; and
   returning said protocol-specific object to said CIM object manager, whereby said CIM object manager communicates with said CIM repository using said associated communication protocol.

8. The computer-readable medium of claim 7 further comprising computer code for effecting the following:

invoking a method defined upon said protocol-specific object;

transmitting said method using said communication protocol associated with that selected one of the plurality of CIM repositories, over said connection to said selected one of the plurality of CIM repsitories; and returning a result to said CIM object manager over said connection using said communication protocol associated with that selected one of the plurality of CIM repositories.

9. The computer-readable medium of claim 7 wherein said communication protocol associated with that selected one of the plurality of CIM repositories is LDAP, JDBC, or JAVA.

10. The computer-readable medium of claim 7 wherein said creating a protocol-specific object includes calling a JAVA factory class.

* * * * *

UNITED STATES PATENT AND TRADEMARK OFFICE
CERTIFICATE OF CORRECTION

| | |
|---|---|
| PATENT NO. | : 6,976,262 B1 |
| APPLICATION NO. | : 09/333591 |
| DATED | : December 13, 2005 |
| INVENTOR(S) | : Davis et al. |

It is certified that error appears in the above-identified patent and that said Letters Patent is hereby corrected as shown below:

In the claims:

(column 11, line 59) delete "at" after "and".

(column 13, line 6) change "repsitories" to --repositories--.

Signed and Sealed this

Twenty-second Day of August, 2006

JON W. DUDAS
*Director of the United States Patent and Trademark Office*